Nov. 30, 1965

D. G. MOATES 3,220,742

VACUUM COUPLING FOR SELF-DRILLING
MASONRY ANCHOR CHUCKS

Filed Jan. 21, 1963

INVENTOR.
DAVID G. MOATES
BY
B. B. Olive
ATTORNEY

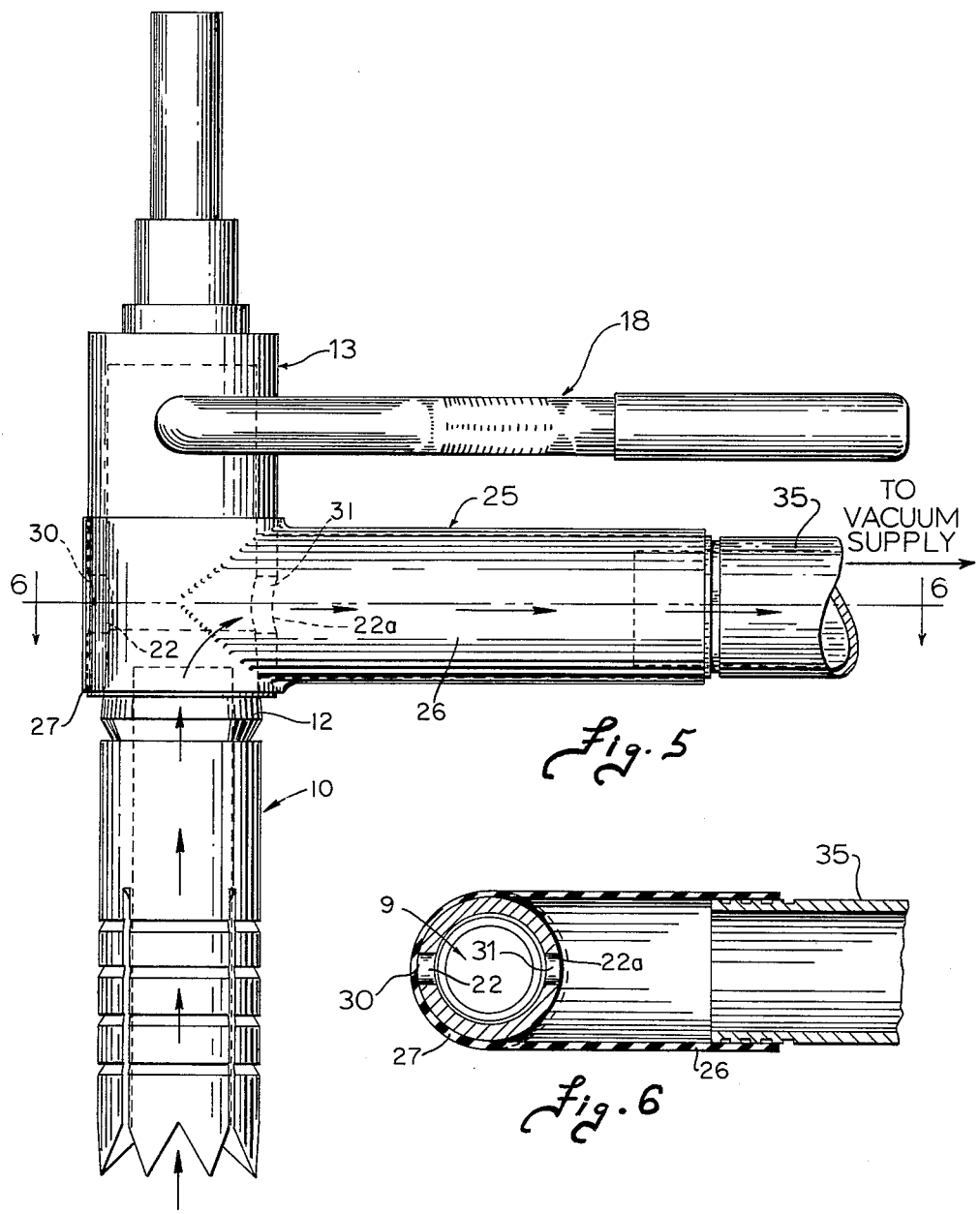

United States Patent Office 3,220,742
Patented Nov. 30, 1965

3,220,742
VACUUM COUPLING FOR SELF-DRILLING MASONRY ANCHOR CHUCKS
David G. Moates, Roanoke Rapids, N.C., assignor to Trade Tools, Inc., Durham, N.C., a corporation of North Carolina
Filed Jan. 21, 1963, Ser. No. 252,699
2 Claims. (Cl. 279—1)

This invention is concerned with a coupling for establishing a vacuum connection to remove dust, debris and the like from holes drilled by self drilling bolt anchors. More specifically the invention is concerned with a vacuum coupling which can be used with a commonly employed type of anchor bolt chuck such that dust and debris can be drawn out of the drilled hole through the anchor while the drilling proceeds.

A well known system for anchoring machines and fixtures to masonry floors employs single use self drilling internally threaded anchors which are driven into the floor by an air or electric hammer or by hand. As the drilling proceeds it is advisable to periodically stop and blow out the hole being drilled or apply a suction hose to remove the dust and debris that accumulates. Unless such dust and debris are removed, it has been found that the cutting effect is impaired and equally important excessive time is required to cut the hole. Particularly in connection with employment of air and electric hammers it is customary to use a chuck between the anchor and the hammer, the chuck serving to transmit the hammer force to the anchor and also to position the anchor. A widely-used form of self drilling anchor chuck receives the anchor in the bottom open end of a thick wall hollow cylindrical base. This base conventionally includes a hole across the width of the base into which an ejector pin can be inserted to drive the anchor out of the chuck and above this first hole there is another hole across the width of the base into which a removable chuck handle is fitted. Chucks of this type do not readily lend themselves to continuous removal of the dust and debris which accumulates during the drilling.

As a modification of the chuck described above there is on the market a special chuck which has a permanent rigid vacuum pipe connection built into the chuck base wall above the ejector pin hole. By applying a continuous vacuum supply to this connection much of the dust and debris can be continuously withdrawn. However, this special base construction has the disadvantage that it outmodes the conventional chuck of which there are a great number already in stock. In operation, this special chuck base construction has another disadvantage in that much of the vacuum effect is lost by reason of the uncovered ejector pin hole passing air.

A general object of the present invention therefore is to provide a means for applying continuous vacuum to the described type of chuck for dust and debris removal which does not require any change in the chuck construction itself.

Another more specific object of the present invention is to provide a vacuum coupling which can be quickly connected to the described chuck in its conventional form.

Another specific object of the invention is to provide a vacuum coupling which is very low in cost such that it can be disposed of if desired after a single use and can be economically included as part of a single use self drilling anchor bolt kit.

These and other objects of the invention will appear as the description proceeds. In the drawings:

FIGURE 5 is an elevation view of the vacuum coupling of the invention assembled with the prior art elements of FIGURE 1.

FIGURE 6 is a sectional plan view taken along line 6—6 of FIGURE 5.

Figures 1, 2, 3, 4:
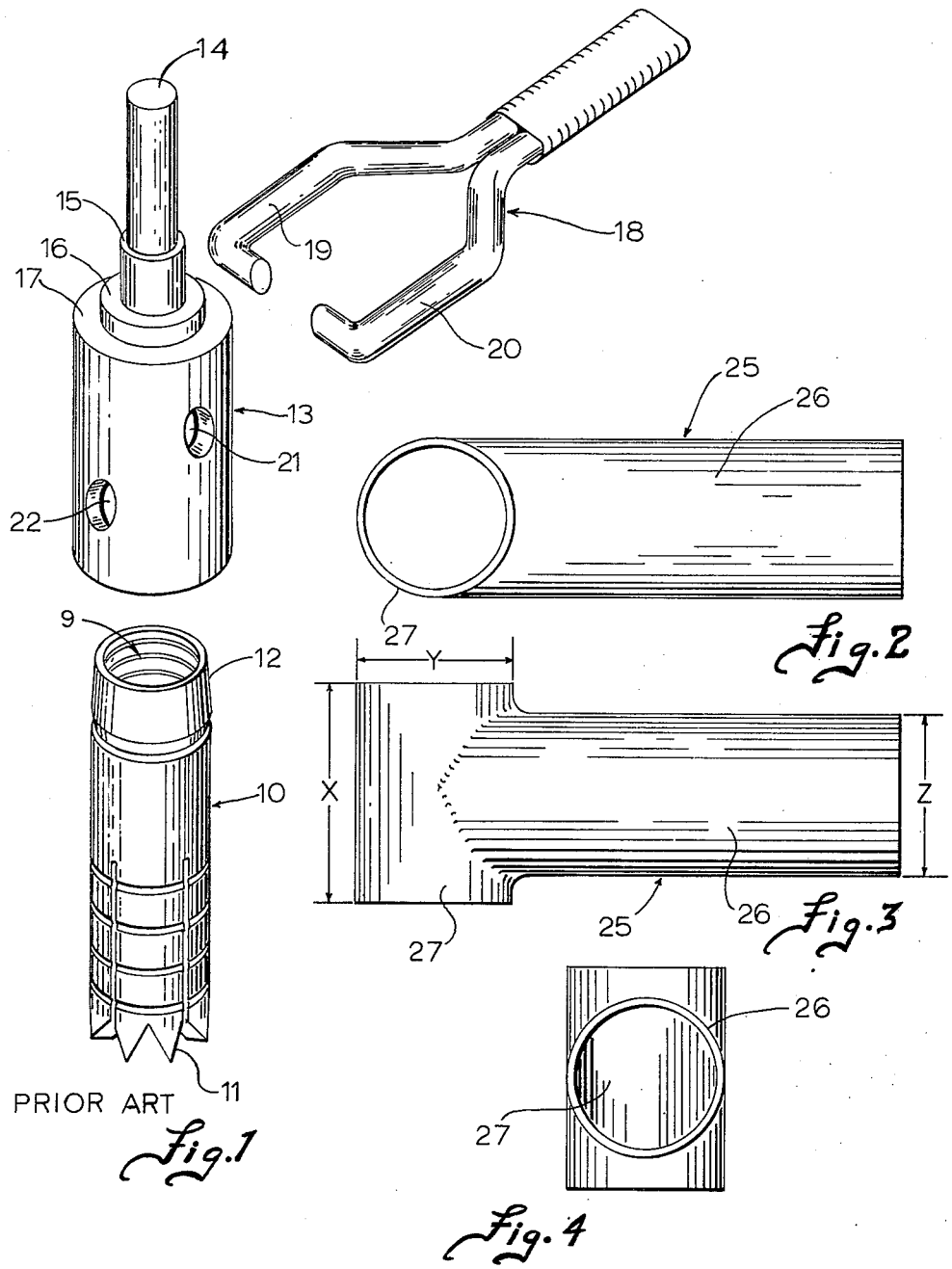
FIGURE 1 is an exploded elevation perspective view of the prior art anchor, chuck and handle elements involved in the invention.
FIGURE 2 is a plan view of a vacuum coupling for an anchor chuck according to the invention.
FIGURE 3 is an elevation view of the vacuum coupling.
FIGURE 4 is an end elevation view of the vacuum coupling.

Primarily for the purpose of giving background information for the invention, there is shown in FIGURE 1 an exploded type perspective view of the prior art elements to which the invention is applied and in which 10 represents a typical self drilling expansion type anchor having cutting teeth 11, a bore 9, and a snap-off taper 12. According to conventional practice the taper 12 of anchor 10 fits into the bottom open end of the chuck 13 which in turn is driven by means of an air or electric hammer, not shown, adapted to fit over the top of the chuck and exert a driving force distributed against the chuck surfaces as for example against the surfaces indicated at 14, 15, 16 and 17. Chucks of this type are provided with a chuck handle as at 18 having two arms 19, 20 which the operator springs apart and fits into the opposite ends of the handle hole indicated at 21. Handle hole 21 is thus normally closed off by the arms 19, 20. Handle 18 facilitates positioning the chuck and anchor and also serves as a means of oscillating the assembly of the chuck and anchor so as to put the teeth 11 into different cutting positions during drilling.

Chucks of the type involved with the invention are further characterized by having another hole having first and second ends 22 and 22a through which an ejector pin, not shown, can be driven for the purpose of knocking taper 12 out of chuck 13 at the end of the drilling and anchor seating operation. The ejector pin hole communicates with the interior hollow portion of the chuck body and consequently communicates with the central bore of anchor 10 whenever anchor 10 is seated in chuck 13.

Having briefly summarized the character of the prior art elements involved, it is to be noted that the invention is specifically directed to the type of self drilling masonry anchor chuck characterized by having a normally open ejector pin hole at the base of the chuck body which communicates with the anchor bore anytime the anchor is seated in the chuck. It is to be understood that many chuck constructions employed in the self drilling anchor bolt art have the characteristic open ejector pin hole at the base of the chuck body even though the upper portion of the chuck body may vary substantially from that shown in FIGURE 1 in order to accommodate different styles of hammers.

Referring next to the novel elements of the invention and FIGURES 2, 3 and 4, the numeral 25 generally represents a vacuum coupling formed in a T configuration of a horizontal elastic thin wall tube member 26 joined at a right angle to a vertical elastic thin wall tube member 27 so as to form in effect two intersecting conduits. A molded tubular heat resistant type rubber is especially suited for forming the first of the tubes 27 and the second of the tubes 26 into the composite coupling 25.

Both members should preferably be of the same inexpensive elastic material though it is contemplated that member 26 might take the form of a rigid tube and be secured to member 27 with member 27 being an elastic tube.

As best illustrated in FIGURES 5 and 6 the coupling 25 is applied by fitting the member 27 such that the wall of member 27 covers one end 22 of the ejecting pin hole as at 30 and member 26 is located opposite the other end 22a of the ejecting pin hole as at 31. With coupling 25 fitted as described and with anchor 10 fitted in chuck 13, a rigid vacuum supply line represented by 35 may be connected to member 26. Assuming drilling is in progress it can be seen that dust and debris can be continuously drawn, as indicated by the flow lines in FIGURE 5, through the bore of the anchor 10, through the hole end 22a into member 26 and consequently into the vacuum supply line 35.

With the described concept in mind, it will be appreciated that the length X and diameter Y of elastic tube member 27 will vary with the size of the chuck body and the location of the ejecting pin hole with respect to the chuck body. The diameter dimension Z of tube member 26 will likewise vary with the size of the vacuum supply line. In all instances however the vacuum coupling may take a form which is adaptable to the existing chuck structure and which acts to close off any air leakage at the ejector pin hole. Of particular significance from a commercial viewpoint, the coupling of the invention fits into the concept of single use. That is, like the anchor which is only used once, the coupling can be manufactured at such low cost that a coupling made according to the invention may be included with each anchor and disposed of after a single use.

Having described my invention what I claim is:

1. In combination, a chuck adapted to mount a self-drilling expansion anchor and being of the type characterized by a cylindrical body having an axial bore opening at one end only of said body for receiving an anchor therein, and a transverse bore communicating at each end with said axial bore and located adjacent the said one end of the body for receiving anchor ejector means therein; a vacuum coupling detachably mounted on said chuck, said coupling comprising a first thin wall cylindrical elastic tube frictionally engaging a major portion of the outer circumferential surface of said body, the elastic nature and diameter of said first tube being adapted to various sizes of said body for covering one end only of said transverse bore, and a second thin wall cylindrical elastic tube integrally secured at one end to said first tube in a T configuration and communicating with the uncovered end of said transverse bore thereby enabling cutting dust and the like to be removed through said uncovered end upon application of a vacuum source to said second tube.

2. In combination, a chuck adapted to mount a self-drilling expansion anchor and being of the type characterized by a cylindrical body having an axial bore opening at one end only of said body for receiving an anchor therein, and a transverse bore communicating at each end with said axial bore and located adjacent said one end of the body for receiving ejector means therein; a vacuum coupling detachably mounted on said chuck, said coupling comprising a first thin wall cylindrical elastic tube having a diameter substantially less than the diameter of said body and frictionally engaging a major portion of the outer circumferential surface of said body for covering one end only of said transverse bore, and a second cylindrical tube integrally secured at one end to said first tube at an angle thereto and communicating with the uncovered end of said transverse bore thereby enabling cutting dust and the like to be removed through said uncovered end upon application of a vacuum source to said second tube.

References Cited by the Examiner
UNITED STATES PATENTS

| | | | |
|---|---|---|---|
| 291,568 | 1/1884 | Borchardt | 175—207 |
| 2,789,934 | 4/1957 | Busback. | |
| 2,829,908 | 4/1958 | Brochetti | 175—209 |
| 2,918,290 | 12/1959 | Werstein | 279—19 |
| 2,990,024 | 6/1961 | Van Allsburg | 175—213 |
| 3,070,382 | 12/1962 | Dieterich | 279—103 |

ROBERT C. RIORDON, *Primary Examiner.*